C. SCHILPP.
DETACHABLE SLEIGH RUNNERS FOR BABY CARRIAGES.
APPLICATION FILED MAR. 28, 1913.

1,093,483.

Patented Apr. 14, 1914.

Witnesses
M. H. Slifer
J. W. Garner

Inventor
Charles Schilpp

By Victor J. Evans
Attorney

UNITED STATES PATENT OFFICE.

CHARLES SCHILPP, OF PHILADELPHIA, PENNSYLVANIA.

DETACHABLE SLEIGH-RUNNERS FOR BABY-CARRIAGES.

1,093,483.

Specification of Letters Patent. Patented Apr. 14, 1914.

Application filed March 28, 1913. Serial No. 757,419.

*To all whom it may concern:*

Be it known that I, CHARLES SCHILPP, a citizen of the United States, residing at Philadelphia, in the county of Philadelphia and State of Pennsylvania, have invented new and useful Improvements in Detachable Sleigh-Runners for Baby-Carriages, of which the following is a specification.

This invention relates to improvements in detachable runners for carriages and other vehicles, and more especially for baby carriages, adapted to be secured on the spindles of the axles after the wheels of the carriage or vehicle have been removed so as to convert the vehicle into a sleigh, one object of the invention being to effect improvements in the construction of detachable runners whereby the same are provided with hub or attaching devices that may be readily fitted on the axle spindles, another object being to provide improved means for connecting and bracing the runners; another object being to effect improvements in the construction of the runners whereby they are adapted to be used in connection with seat supports and a package carrying board.

With the above and other objects in view, my invention consists in the construction, combination and arrangement of devices hereinafter described and claimed.

Figure 1:
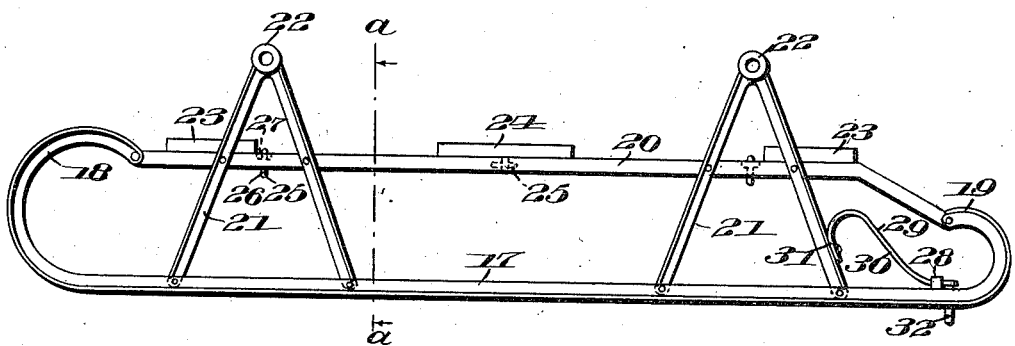
Figure 2:
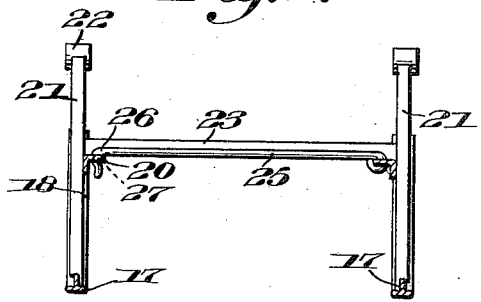

In the accompanying drawings: Figure 1 is a side elevation of a detachable sleigh runner and seat boards and a package carrying board arranged thereon in accordance with my invention. Fig. 2 is a detail transverse sectional view of a pair of my runners and their coacting parts on the plane indicated by the line *a—a* of Fig. 1.

Each runner 17 is preferably made of iron or steel and of the appropriate length or other dimensions according to the vehicle on which the runners are to be used. The runners are provided at their front and rear ends with integral upturned and curved portions 18 and 19 which are connected together by raves 20. The raves also form the cross bars of standards 21 which are A-shaped, each standard comprising a pair of upwardly converging bars and an eye or hub element 22 which is adapted to be placed on one of the axle spindles of a baby carriage or other vehicle. The runners will be attached to the axle spindles after the wheels of the vehicle have been removed and be held in place by the usual nuts such as are employed for securing the wheels.

The raves 20 of the runners 17 serve to support front and rear seat boards 23 and to also support a centrally arranged board 24 on which packages or the like may be placed. It will be understood that the seat and package carrying boards will only be employed on the runners when the latter are not attached to a baby carriage or other vehicle. Hence, my improved runners may be used either with a baby carriage or other vehicle to convert the latter into a sleigh or may be used for forming a sled or sleigh comprising the said runners and the seat and package carrying boards.

Brace rods 25 are each pivoted at one end on the rave of one of the runners and provided at the opposite end with a hook 26 adapted to engage an eye or opening 27 in the rave of the other runner so that these brace rods serve to connect and to brace the runners. These brace rods are arranged opposite the centers of the standards 21 and one of them is also arranged midway between the front and rear ends of the runners. One of the runners is provided near its rear end with a catch 28 which rises and also extends transversely inwardly therefrom. The said runner is also provided with a spring brake 29 which is here shown as comprising a compound curved spring arm 30, secured to the rear side of one of the standards 21 as at 31 and a downwardly extending pick or point 32 at the free end of the said spring arm. The spring arm when disengaged from the catch raises the pick or point above the surface of the snow or ice.

When it is desired to apply the brake in order to hold the sleigh from moving casually it is only necessary to press with the foot on the free end of the spring arm 30 so as to force the pick or point down into the snow or ice and to engage the arm 30 with the catch 28 to hold said pick or point in such engagement. It will be understood that the spring arm can also be readily disengaged from the catch when it is desired to release the vehicle. My improved runners may be used on ordinary folding carriages or on those that do not fold and may be made of any size desired according to the size of the vehicle on which they are to be employed.

While I have herein shown and described a preferred form of my invention, I would have it understood that changes may be made in the form, proportion and construction of the several parts without departing from the spirit of my invention and within the scope of the appended claim.

I claim:—

A sleigh comprising a pair of runners having standards each provided with a cross piece and also provided at its upper end with a hub member to receive a spindle of a vehicle axle, raves secured to the inner sides of said standards at points below the hub members, cross boards detachably secured on the raves and transversely arranged brace rods securing the runners together and detachably secured to the cross pieces of the standards.

In testimony whereof I affix my signature in presence of two witnesses.

CHARLES SCHILPP.

Witnesses:
EDWARD RYAN,
WILLIAM HINTON.

Copies of this patent may be obtained for five cents each, by addressing the "Commissioner of Patents, Washington, D. C."